US010310909B2

(12) United States Patent
Benjamini et al.

(10) Patent No.: US 10,310,909 B2
(45) Date of Patent: Jun. 4, 2019

(54) MANAGING EXECUTION OF COMPUTER OPERATIONS WITH NON-COMPETING COMPUTER RESOURCE REQUIREMENTS

(71) Applicant: INTERNATIONAL BUSINESS MACHINES CORPORATION, Armonk, NY (US)

(72) Inventors: Yiftach Benjamini, Haifa (IL); Eyal Gonen, Haifa (IL); Alexander Mesh, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 288 days.

(21) Appl. No.: 15/262,135

(22) Filed: Sep. 12, 2016

(65) Prior Publication Data

US 2018/0074850 A1 Mar. 15, 2018

(51) Int. Cl.
*G06F 9/50* (2006.01)
(52) U.S. Cl.
CPC ........ *G06F 9/505* (2013.01); *G06F 2209/503* (2013.01)
(58) Field of Classification Search
CPC ......... G06F 9/48; G06F 9/50; G06F 2209/503
See application file for complete search history.

(56) References Cited

U.S. PATENT DOCUMENTS 8,190,804 B1* 5/2012 Srinivasan .......... G06F 13/1615 710/240
8,521,982 B2* 8/2013 Cargnoni .............. G06F 12/084 711/122

(Continued)

FOREIGN PATENT DOCUMENTS

WO WO 2014/113225 A1 7/2014

OTHER PUBLICATIONS

J. Stuechel et al, CAPI: A Coherent Accelerator Processor Interface, IBM Res, & DEV. vol. 59, No. 1, paper 7, Jan./Feb. 2015 (Year: 2015).*

(Continued)

*Primary Examiner* — Henry Tsai
*Assistant Examiner* — Christopher Daley
(74) *Attorney, Agent, or Firm* — Margaret McNamara, Esq.; Kevin P. Radigan, Esq.; Heslin Rothenberg Farley & Mesiti P.C.

(57) ABSTRACT

Managing execution of computer operations by determining that a computer resource targeted by a command's first operation is available, in a candidate processing record in a processing records schedule, to receive an instruction to perform the first operation, determining that a computer resource targeted by the command's second operation is available, in a processing record in the schedule at a processing offset relative to the candidate record, to receive an instruction to perform the second operation, the processing offset being an expected processing latency associated with the command, scheduling the computer resource targeted by the first operation to receive the instruction to perform the first operation when processing the candidate record in the schedule, and scheduling the computer resource targeted by the second operation to receive the instruction to perform the second operation when processing the processing record in the schedule at the processing offset relative to the candidate record.

20 Claims, 7 Drawing Sheets

(56) References Cited

U.S. PATENT DOCUMENTS

| | | | |
|---|---|---|---|
| 9,037,811 B2 | 5/2015 | Gilda et al. | |
| 2010/0268882 A1* | 10/2010 | Cargnoni | G06F 12/084 |
| | | | 711/122 |
| 2013/0103903 A1* | 4/2013 | Rajagopalan | G06F 12/0895 |
| | | | 711/118 |

OTHER PUBLICATIONS

Mahdi Nazm et al, PARDIS: (Year: 2011).*
W.J. Starke et al The cache and memory subsystems of the IBM Power8 processor. IBM J. Res & Dev. vol. 59, No. 1 Paper 3 Jan./Feb. 2015 (Year: 2015).*
Bojnordi et al., "PARDIS: A Programmable Memory Controller for the DDRx Interfacing Standards", Proceedings of the 39th Annual International Symposium on Computer Architecture (ISCA '12), IEEE Computer Society, Washington, D.C. (2012) (pp. 13-24).

* cited by examiner

| Delay | 1/2/3 | 1 | 3 | 1 | 1 | 1 |
|---|---|---|---|---|---|---|
| Command/Interface | AFU Rd | AFU Wr | CD Rd | CD Wr | LF Rd | LA Wr |
| Read CL-HIT | | X | X | | | |
| Read CL-MISS | | X | | X | X | |
| Write CL-Full HIT | X | | | X | | |
| Write CL-Partial HIT | X | | X | X | | |
| Write CL-Full MISS | X | | | X | X | |
| Write CL-Partial MISS | X | | X | X | | |
| Evict | | | X | | | X |

FIG. 2

| AFU READ | AFU WRITE | CD READ | CD WRITE | LA READ | LA WRITE |
|---|---|---|---|---|---|
| 1 | | | | | |
| 1 | 1 | | | 1 | |
| | | | | | 1 |
| | | 1 | | | |
| | | | 1 | | |
| | | | | | |
| | | | | | |
| | | | | | |

THIRD COMMAND

FIG. 4C

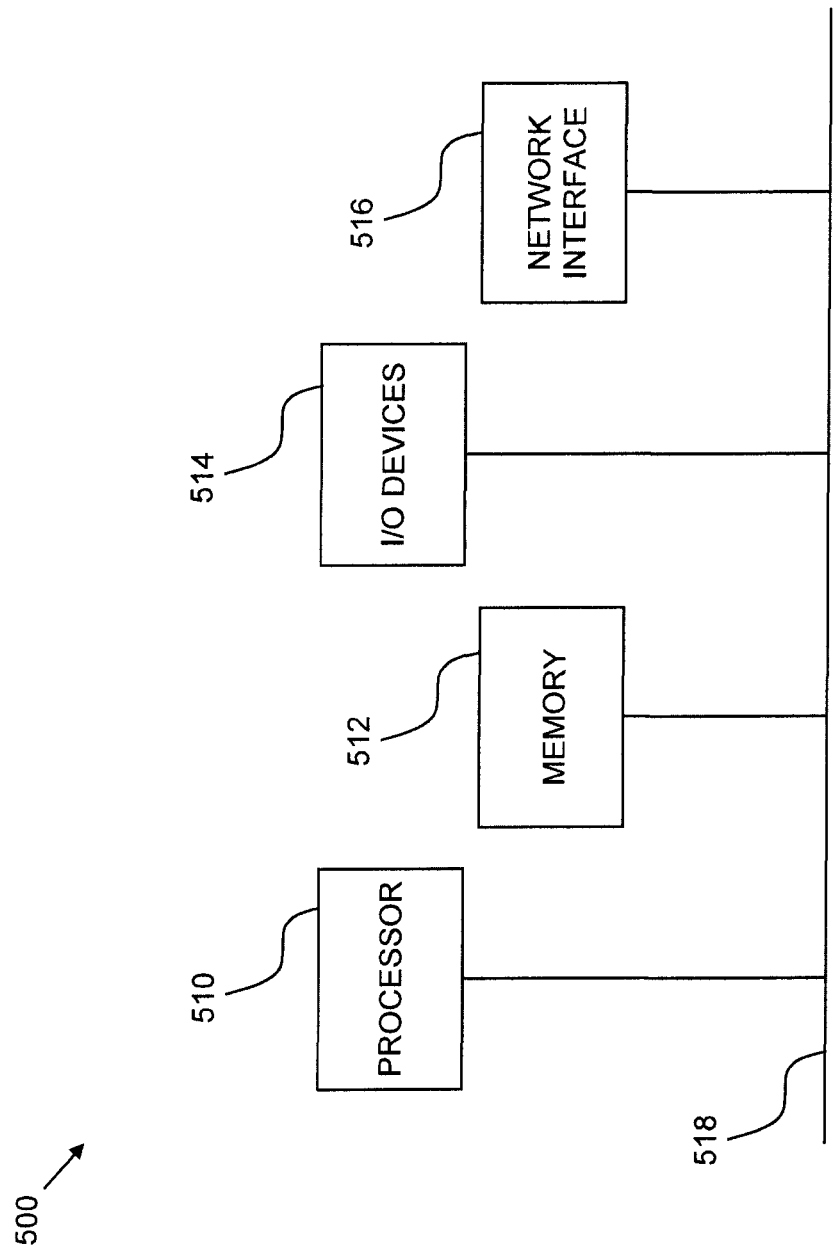

MANAGING EXECUTION OF COMPUTER OPERATIONS WITH NON-COMPETING COMPUTER RESOURCE REQUIREMENTS

BACKGROUND

A POWER service layer (PSL) unit of a Coherent Accelerator Process Interface (CAPI) device has at least three separate read/write data interfaces, one towards its internal cache, one towards the accelerator it is servicing, and one towards the link between the PSL device and the POWER processor chip. Various types of commands typically involve different read and write operations involving different ones of these read/write data interfaces and having different clock cycle latencies between them. Current approaches for executing such commands may result in a command having to wait to be processed until a previous command requiring one or more of the same interfaces has been processed.

SUMMARY

In one aspect of the invention a method is provided for managing execution of computer operations, the method including: determining that a computer resource targeted by a first operation of a command is available in a candidate processing record in a schedule of processing records, to receive an instruction to perform the first operation; determining that a computer resource targeted by a second operation of the command, is available, in a processing record in the schedule of processing records at a processing offset relative to the candidate processing record, to receive an instruction to perform the second operation, where the processing offset is an expected processing latency associated with the command; scheduling the computer resource targeted by the first operation to receive the instruction to perform the first operation when processing the candidate processing record in the schedule of processing records; and scheduling the computer resource targeted by the second operation to receive the instruction to perform the second operation when processing the processing record in the schedule of processing records at the processing offset relative to the candidate processing record.

In other aspects of the invention systems and computer program products embodying the invention are also provided.

BRIEF DESCRIPTION OF THE DRAWINGS

Aspects of the invention will be understood and appreciated more fully from the following detailed description taken in conjunction with the appended drawings in which:

FIG. 2 is an exemplary command/resource table for use in accordance with one or more aspects of the present invention;

FIGS. 4A-4C is a simplified example which shows the state of a schedule at various times with respect to the scheduling of various commands in accordance with one or more aspects of the present invention; and FIG. 5 is a simplified block diagram illustration of an exemplary hardware implementation of a computing system, constructed and operative in accordance with one or more aspects of the present invention.

DETAILED DESCRIPTION

Figure 1:
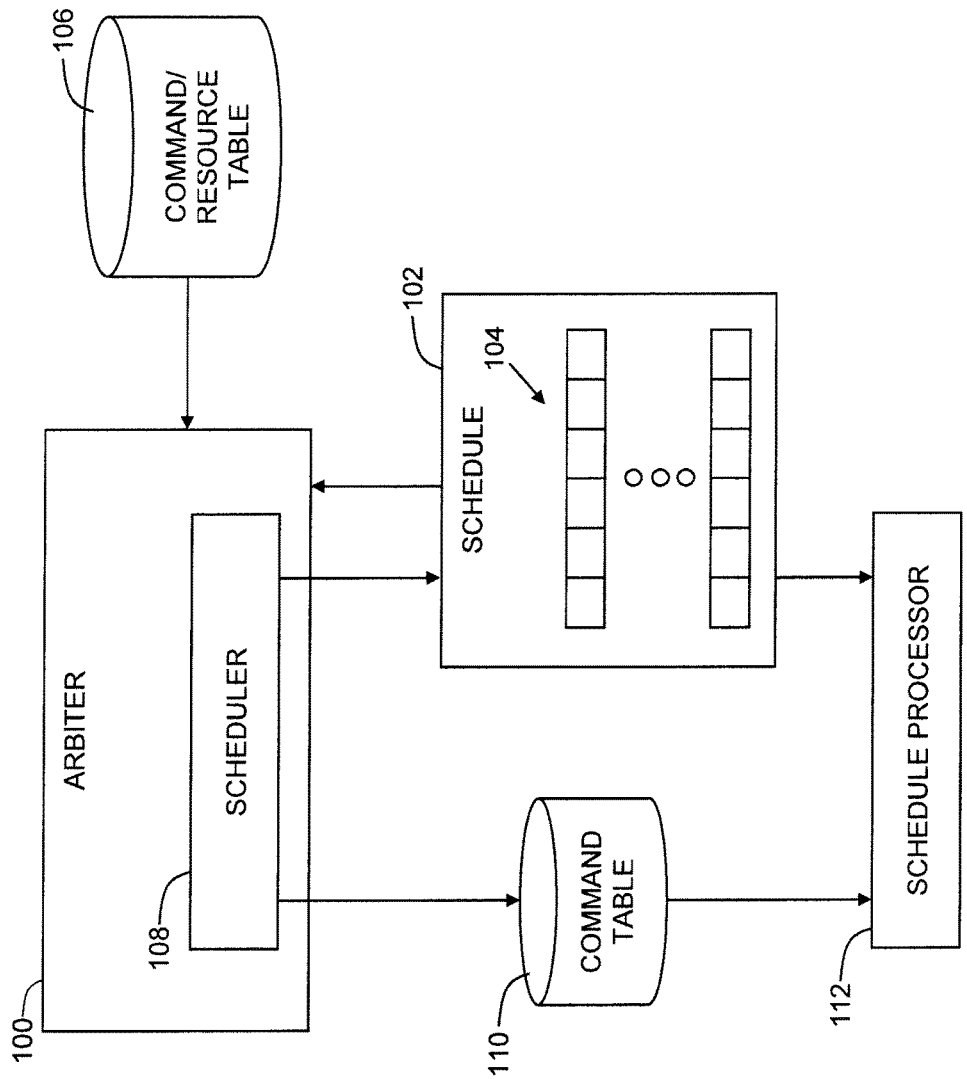
FIG. 1 is a simplified conceptual illustration of a system for managing execution of computer operations, constructed and operative in accordance with one or more aspects of the present invention.

Reference is now made to FIG. 1, which is a simplified conceptual illustration of a system for managing execution of computer operations, constructed and operative in accordance with an embodiment of the invention. In the system of FIG. 1, an arbiter 100 may be configured to check a schedule 102 for the purpose of scheduling computer operations, such as data read and data write operations, associated with commands that are processed by arbiter 100. Schedule 102 includes a sequence of processing records 104, where each processing record 104 indicates the availability of one or more computer resources to receive instructions during a computer processing clock cycle to perform an operation associated with a command, such as where each processing record 104 includes a series of bits that are used to represent the computer resources, where, for example, a 0 bit value indicates that the computer resource is available and a 1 bit value indicates that the computer resource is unavailable. For example, each processing record in schedule 102 may indicate this availability of each of the three read interfaces and the three write interfaces of the POWER service layer (PSL) on a Coherent Accelerator Process Interface (CAPI) compliant accelerator card of a POWER™ system, commercially-available from International Business Machines Corporation or Armonk, N.Y., where the PSL has both a read interface and a write interface to each of an Accelerator Function Unit (AFU), a Cache Data array (CD), and a Link Arbiter (LA).

Arbiter 100 may be configured to access a command/resource table 106 which lists various types of known commands, the operations associated with each type of command, the computer resource associated with each of the operations, and the expected clock-cycle latencies between the operations. An example of command/resource table 106 for use with CAPI/PSL is shown in FIG. 2, which includes seven rows of commands, each row representing a different command type, and six columns of computer resources, representing data read operations and data write operations for each of the AFU, CD, and LA. Thus, the command "Read CL-MISS," which represents a cache line read after a miss, requires an LA read operation followed by parallel AFU write and CD write operations, with an expected latency of 1 clock cycle between the read operation and the write operations, indicating that the write operations may be performed during the clock cycle following the clock cycle during which the read operation is performed. Expected latencies may be based on actual historical data or user-configurable latencies, such as a user-configurable latency of 1, 2, or 3 clock cycles after an AFU read operation as shown in FIG. 2.

Thus, for any given command processed by arbiter 100, arbiter 100 accesses command/resource table 106 to determine the operations and computer resources required by the command given its type, as well as the expected clock-cycle latency between the operations, and then checks schedule 102 to identify the processing records 104 into which the operations may be scheduled. For example, given a command that requires an AFU read operation followed by a CD write operation with an expected latency of 2 clock cycles between the read operation and the write operation(s), arbiter 100 determines whether the AFU read interface is available in a candidate processing record 104, such as which corresponds to the current processor clock cycle, to receive an instruction to perform the read operation, as well as whether the CD write interface is available in a processing record 104 at a processing offset of 2 processing records relative to candidate processing record 104, being two records after candidate processing record 104 in the sequence of processing records 104, to receive an instruction to perform the CD write operation, where the processing offset corresponds to the expected processing latency associated with the command. If all of the computer resources required for the command's operations are available in their respective processing records 104 to receive instructions, then the command's operations may be scheduled into their respective processing records 104. Otherwise, if any of the computer resources required for the command's operations are unavailable in their respective processing records 104 to receive instructions, then the command's operations are not scheduled into the candidate processing record 104 and the processing record 104 at the processing offset, whereupon arbiter 100 may check the availability of the computer resources required for the command's operations as described above staring with a different candidate processing record 104, such as with the processing record 104 immediately following candidate processing record 104 in the sequence of processing records 104 in schedule 102.

A scheduler 108, which may be implemented within arbiter 100, may be configured to schedule the computer resources required for a command's operations in their respective processing records 104 once it has been determined that all of the computer resources required for the command's operations are available in their respective processing records 104 to receive instructions, such as changing a 0 bit value associated with a required computer resource in a given processing record 104 to a 1 bit value to indicate that the computer resource is unavailable. Scheduler 108 may also be configured to store other information associated with the command and required for performing the command's operations, such as in a command table 110, including, for example, memory addresses associated with its data read and data write operations, as well as a mapping between the command and the processing records 104 in schedule 102 that are associated with the command's operations.

A schedule processor 112 may be configured to sequentially process processing records 104 in schedule 102 by selecting a processing record 104, typically being the oldest unprocessed processing record 104 in schedule 102, for processing during a current processing cycle, being the current clock cycle of an associated processor. For each computer resource that is scheduled in the selected processing record 104 to receive instructions to perform an operation associated with a command, the command's information is accessed in command table 110, and the computer resource is instructed to perform the operation. Schedule processor 112 may repeat this process during the next processing cycle by selecting and processing the next processing record 104 in schedule 102, and so on for subsequent processing records 104 during subsequent processing cycles.

Any of the elements shown in FIG. 1 may be implemented in computer hardware and/or in computer software embodied in a non-transitory, computer-readable medium in accordance with conventional techniques.

Figure 3:
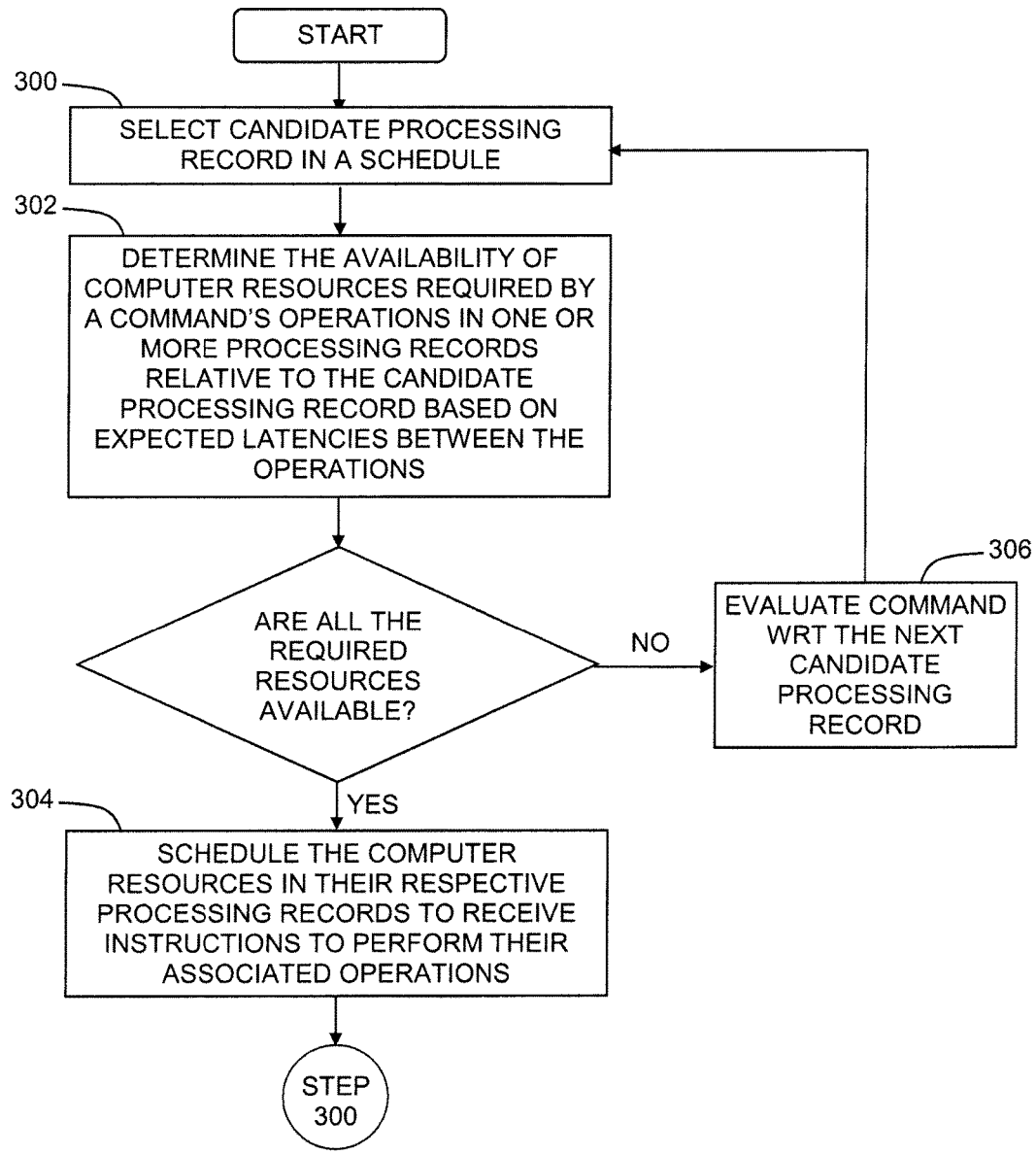
FIG. 3 is a simplified flowchart illustration of an exemplary method of operation of the system of FIG. 1, operative in accordance with one or more aspects of the present invention.

Referring to FIG. 3, one embodiment of an exemplary method of operation of the system of FIG. 1 is illustrated, operative in accordance with one or more aspects of the present invention. In the method of FIG. 3, a candidate processing record in a schedule of processing records is selected (step 300). A determination is made of the availability of computer resources required by a command's operations in one or more processing records relative to the candidate processing record based on expected latencies between the operations (step 302). If all of the computer resources in their respective processing records are available, then the computer resources are scheduled in their respective processing records to receive instructions to perform their associated operations (step 304). If any of the computer resources are unavailable in their respective processing records, the above steps are repeated for the command when the next candidate processing record in the schedule of processing records is selected (step 306).

Figure 4A:
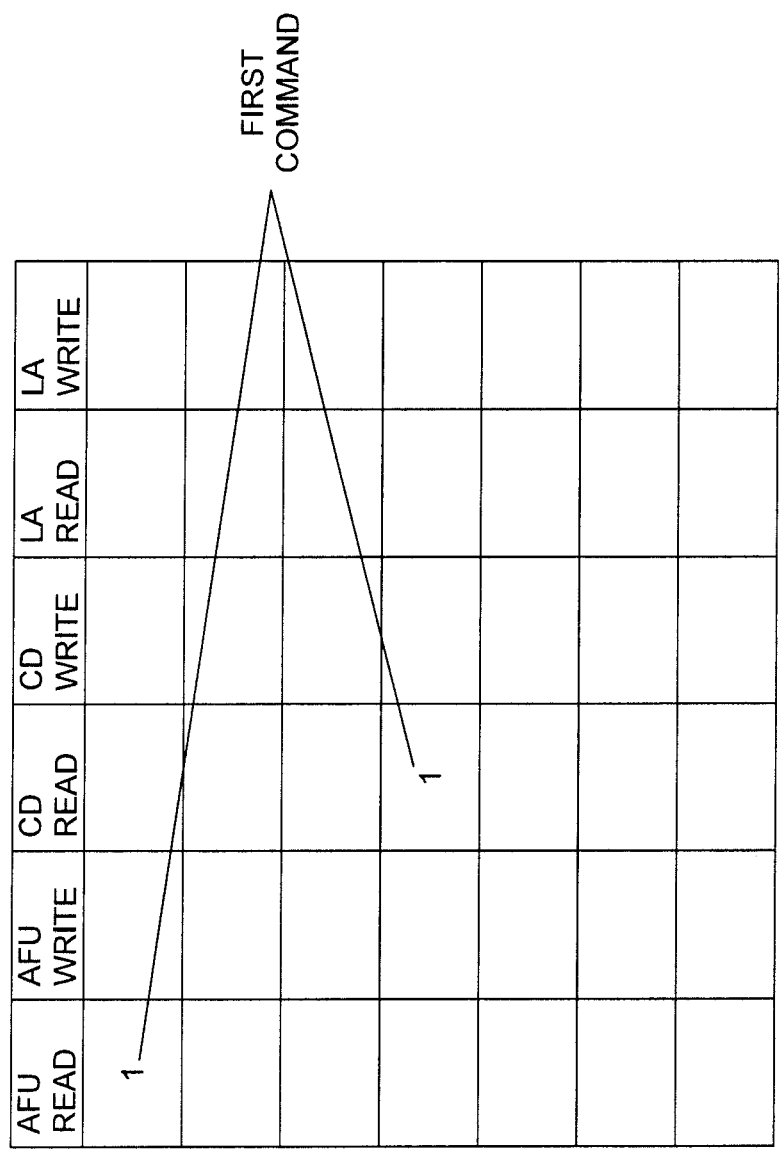
Figure 4B:
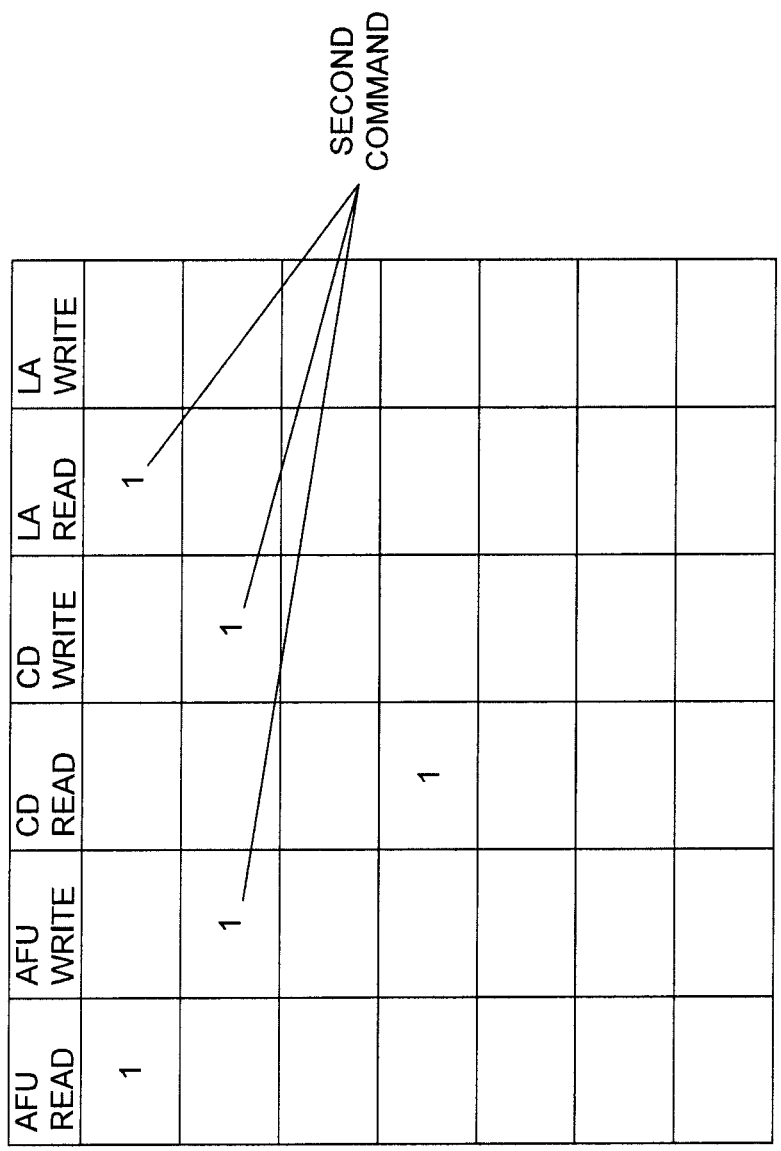

The system of FIG. 1 and method of FIG. 3 may be further appreciated in the context of the simplified example shown in FIGS. 4A-4C, which shows the state of a schedule with respect to the scheduling of various commands in accordance with one or more aspects of the present invention. In FIG. 4A, the operations of a first command are scheduled as shown, where an AFU read operation that is followed by a CD write operation with an expected latency of 3 cycles is scheduled using 1 bits in the first and fourth rows of the schedule, corresponding to the first and fourth processing records in the schedule. (For the sake of simplicity, 0 bits indicating computer resource availability are not shown.) In FIG. 4B, the operations of a second command are scheduled as shown, where an LA read operation that is followed by both a CD write operation and an AFU write operation with an expected latency of 1 cycle is scheduled in the first and second rows of the schedule, corresponding to the first and second processing records in the schedule. It is noted that as the computer resource requirements of the first command are independent of the computer resource requirements of the second command, the read operations of both commands may be scheduled in the same processing record in the schedule, being the first record. In FIG. 4C, the operations of a third command are scheduled as shown, where an AFU read operation is followed by an LA write operation with an expected latency of 1 cycle. Since the AFU is unavailable for a read operation in the first row of the schedule, the operations of the third command are scheduled in the second and third rows of the schedule.

Referring now to FIG. 5, block diagram 500 illustrates an exemplary hardware implementation of a computing system in accordance with which one or more components/methodologies of the invention (e.g., components/methodologies described in the context of FIGS. 1-4C) may be implemented, according to an embodiment of the invention.

As shown, one or more aspects of the present invention may be implemented in accordance with a processor 510, a memory 512, I/O devices 514, and a network interface 516, coupled via a computer bus 518 or alternate connection arrangement.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of managing execution of computer operations, the method comprising:
   establishing a schedule of processing records to process operations associated with commands, each processing record indicating availability status of multiple computer resources which receive instructions to perform respective operations associated with the commands;
   determining that a computer resource of the multiple computer resources targeted by a first operation of a command is available in a candidate processing record in the schedule of processing records, to receive an instruction to perform the first operation;
   determining that a different computer resource of the multiple computer resources targeted by a second operation of the command is available in a different processing record in the schedule of processing records at a processing offset relative to the candidate processing record, to receive an instruction to perform the second operation, wherein the processing offset is an expected processing latency between the first and second operations associated with the command;
   based on determining that the computer resource targeted by the first operation of the command is available in the candidate processing record and that the different computer resource targeted by the second operation of the command is available in the different processing record in the schedule of processing records at the processing offset of the expected processing latency between the first and second operations associated with the command, scheduling the computer resource targeted by the first operation to receive the instruction to perform the first operation when processing the candidate processing record in the schedule of processing records; and
   based on determining that the computer resource targeted by the first operation of the command is available in the candidate processing record and that the different computer resource targeted by the second operation of the command is available in the different processing record in the schedule of processing records at the processing offset of the expected processing latency between the first and second operations associated with the command, scheduling the computer resource targeted by the second operation to receive the instruction to perform the second operation when processing the processing record in the schedule of processing records at the processing offset relative to the candidate processing record.

2. The method according to claim 1, further comprising performing the determining and scheduling wherein the candidate processing record is associated with a current processing cycle.

3. The method according to claim 1, further comprising performing the determining and scheduling for a plurality of commands, wherein any of the processing records in the schedule of processing records includes schedules for at least two different computer resources to receive instructions to perform operations of at least two different ones of the plurality of commands.

4. The method according to claim 1, further comprising sequentially processing the processing records in the schedule of processing records,
   wherein a currently-selected one of the processing records in the schedule of processing records is processed during a current processing cycle, wherein in the currently-selected processing record every computer resource that is scheduled to receive instructions to perform an associated operation is instructed to perform the associated operation during the current processing cycle, and
   wherein a next-selected one of the processing records in the schedule of processing records that immediately follows the currently-selected processing record is processed during a next processing cycle that immediately follows the current processing cycle, wherein in the next-selected processing record every computer resource that is scheduled to receive instructions to perform an associated operation is instructed to perform the associated operation during the next processing cycle.

5. The method according to claim 1, further comprising performing the determining and scheduling wherein the first operation of the command is a data read operation and wherein the second operation of the command is a data write operation.

6. The method according to claim 1, further comprising performing the determining and scheduling for a subsequent command in at least one processing record in the schedule of processing records following the candidate processing record, responsive to determining that a computer resource targeted by an operation of the subsequent command is unavailable, in the candidate processing record in the schedule of processing records, to receive an instruction to perform the operation of the subsequent command.

7. The method according to claim 1, further comprising performing the determining and scheduling for a subsequent command in at least one processing record in the schedule of processing records following the candidate processing record, responsive to determining that a computer resource targeted by an operation of the subsequent command is unavailable, in a processing record in the schedule of processing records at a processing offset relative to the candidate processing record, wherein the processing offset is an expected processing latency associated with the subsequent command, to receive an instruction to perform the operation of the subsequent command.

8. The method according to claim 1, wherein the determining and scheduling are implemented in at least one of:
   a) computer hardware, and
   b) computer software embodied in a non-transitory, computer-readable medium.

9. A system of managing execution of computer operations, the system comprising:
   a memory; and
   a processor communicatively coupled to the memory, wherein the system performs a method comprising:
      establishing a schedule of processing records to process operations associated with commands, each processing record indicating availability status of multiple computer resources which receive instructions to perform respective operations associated with the commands;

determining that a computer resource of the multiple computer resources targeted by a first operation of a command is available in a candidate processing record in the schedule of processing records, to receive an instruction to perform the first operation;

determining that a different computer resource of the multiple computer resources targeted by a second operation of the command is available in a different processing record in the schedule of processing records at a processing offset relative to the candidate processing record, to receive an instruction to perform the second operation, wherein the processing offset is an expected processing latency between the first and second operations associated with the command;

based on determining that the computer resource targeted by the first operation of the command is available in the candidate processing record and that the different computer resource targeted by the second operation of the command is available in the different processing record in the schedule of processing records at the processing offset of the expected processing latency between the first and second operations associated with the command, scheduling the computer resource targeted by the first operation to receive the instruction to perform the first operation when processing the candidate processing record in the schedule of processing records; and based on determining that the computer resource targeted by the first operation of the command is available in the candidate processing record and that the different computer resource targeted by the second operation of the command is available in the different processing record in the schedule of processing records at the processing offset of the expected processing latency between the first and second operations associated with the command, scheduling the computer resource targeted by the second operation to receive the instruction to perform the second operation when processing the processing record in the schedule of processing records at the processing offset relative to the candidate processing record.

10. The system according to claim 9, wherein the candidate processing record is associated with a current processing cycle.

11. The system according to claim 9, wherein the schedule of processing records includes schedules for at least two different computer resources to receive instructions to perform operations of at least two different ones of the plurality of commands.

12. The system according to claim 9, further comprising sequentially processing the processing records in the schedule of processing records, wherein a currently-selected one of the processing records in the schedule of processing records is processed during a current processing cycle, wherein in the currently-selected processing record every computer resource that is scheduled to receive instructions to perform an associated operation is instructed to perform the associated operation during the current processing cycle, and wherein a next-selected one of the processing records in the schedule of processing records that immediately follows the currently-selected processing record is processed during a next processing cycle that immediately follows the current processing cycle, wherein in the next-selected processing record every computer resource that is scheduled to receive instructions to perform an associated operation is instructed to perform the associated operation during the next processing cycle.

13. The system according to claim 9 wherein the first operation of the command is a data read operation and wherein the second operation of the command is a data write operation.

14. The system according to claim 9, further comprising performing the determining and scheduling for a subsequent command in at least one processing record in the schedule of processing records following the candidate processing record, responsive to determining that a computer resource targeted by an operation of the subsequent command is unavailable, in the candidate processing record in the schedule of processing records, to receive an instruction to perform the operation of the subsequent command.

15. The system according to claim 9, further comprising performing the determining and scheduling for a subsequent command in at least one processing record in the schedule of processing records following the candidate processing record, responsive to determining that a computer resource targeted by an operation of the subsequent command is unavailable, in a processing record in the schedule of processing records at a processing offset relative to the candidate processing record, wherein the processing offset is an expected processing latency associated with the subsequent command, to receive an instruction to perform the operation of the subsequent command.

16. A computer program product for managing execution of computer operations, the computer program product comprising:

a non-transitory, computer-readable storage medium; and computer-readable program code embodied in the storage medium, the computer-readable program code being executable by a processor to perform a method comprising:

establishing a schedule of processing records to process operations associated with commands, each processing record indicating availability status of multiple computer resources which receive instructions to perform respective operations associated with the commands;

determining that a computer resource of the multiple computer resources targeted by a first operation of a command, is available, in a candidate processing record in the schedule of processing records, to receive an instruction to perform the first operation;

determining that a different computer resource of the multiple computer resources targeted by a second operation of the command, is available, in a different processing record in the schedule of processing records at a processing offset relative to the candidate processing record, to receive an instruction to perform the second operation, wherein the processing offset is an expected processing latency between the first and second operations associated with the command;

based on determining that the computer resource targeted by the first operation of the command is available in the candidate processing record and that the different computer resource targeted by the second operation of the command is available in the different processing record in the schedule of processing records at the processing offset of the expected processing latency between the first and second operations associated with the command, scheduling the computer resource targeted by the first operation to receive the instruction to perform the first operation when processing the candidate processing record in the schedule of processing records; and based on determining that the computer resource targeted by the first operation of the command is available in the candidate processing record and that the different computer resource targeted by the second operation of the command is available in the different processing record in the schedule of processing records at the processing offset of the expected processing latency between the first and second operations associated with the command, scheduling the computer resource targeted by the second operation to receive the instruction to perform the second operation when processing the processing record in the schedule of processing records at the processing offset relative to the candidate processing record.

17. The computer program product of claim 16, further comprising performing the determining and scheduling wherein the candidate processing record is associated with a current processing cycle.

18. The computer program product of claim 16, further comprising performing the determining and scheduling for a plurality of commands, wherein any of the processing records in the schedule of processing records includes schedules for at least two different computer resources to receive instructions to perform operations of at least two different ones of the plurality of commands.

19. The computer program product of claim 16, wherein the computer-readable program code is configured to sequentially process the processing records in the schedule of processing records, wherein a currently-selected one of the processing records in the schedule of processing records is processed during a current processing cycle, wherein in the currently-selected processing record every computer resource that is scheduled to receive instructions to perform an associated operation is instructed to perform the associated operation during the current processing cycle, and wherein a next-selected one of the processing records in the schedule of processing records that immediately follows the currently-selected processing record is processed during a next processing cycle that immediately follows the current processing cycle, wherein in the next-selected processing record every computer resource that is scheduled to receive instructions to perform an associated operation is instructed to perform the associated operation during the next processing cycle.

20. The computer program product of claim 16, further comprising performing the determining and scheduling wherein the first operation of the command is a data read operation and wherein the second operation of the command is a data write operation.

* * * * *